M. LACHMAN.
METALLIC WHEEL.
APPLICATION FILED MAR. 10, 1917.
1,256,579.
Patented Feb. 19, 1918.
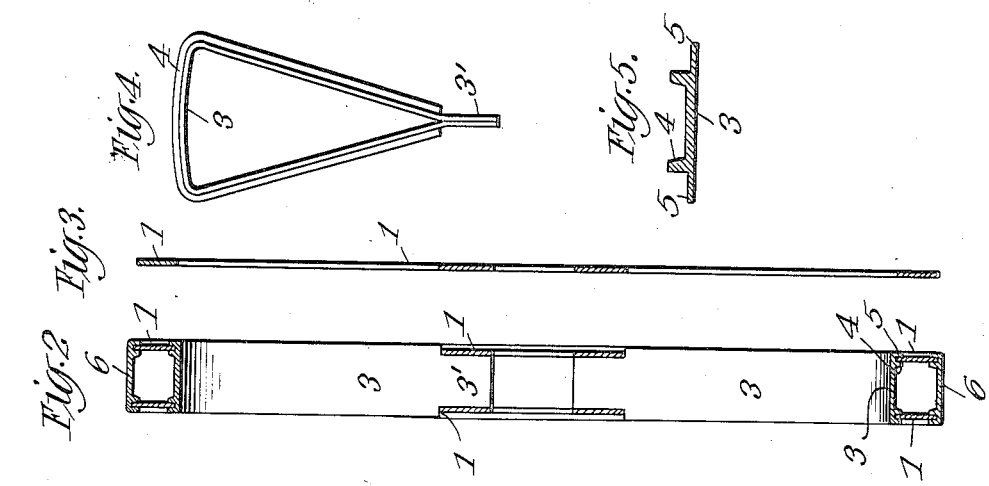
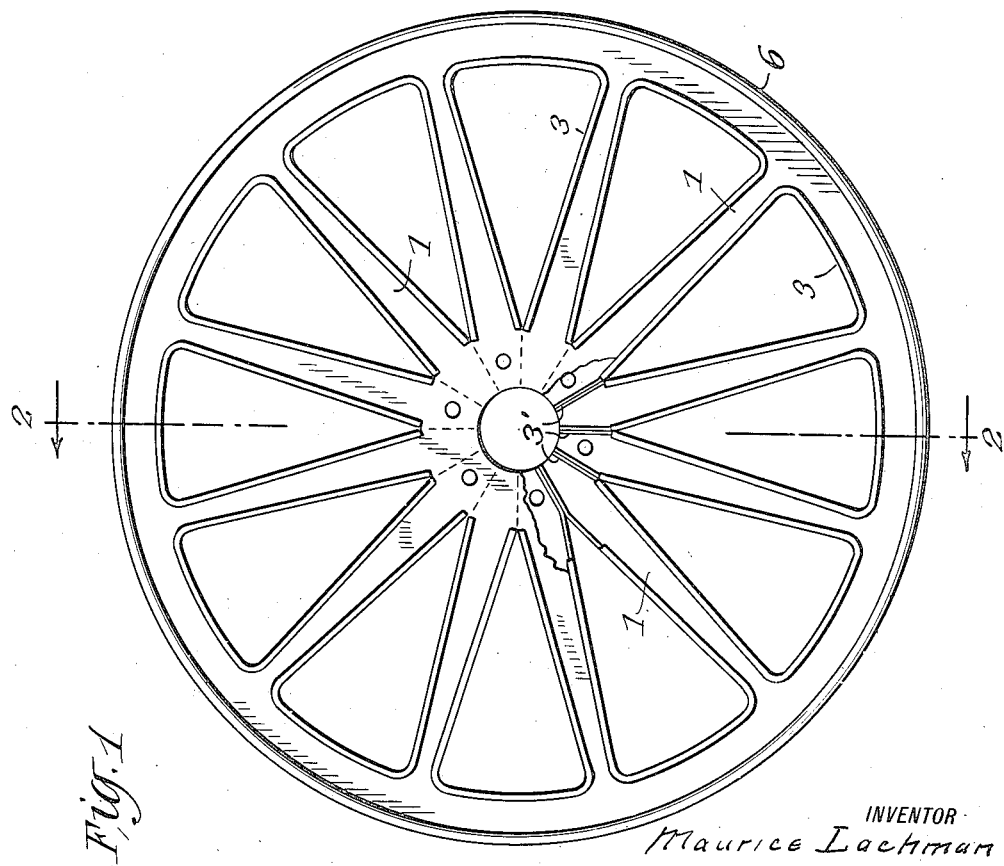
INVENTOR
Maurice Lachman
BY
Townsend & Decker
ATTORNEYS

UNITED STATES PATENT OFFICE.

MAURICE LACHMAN, OF NEW YORK, N. Y., ASSIGNOR TO STRUCTURAL PRESSED STEEL WHEEL COMPANY INC., OF NEW YORK, N. Y., A CORPORATION OF NEW YORK.

METALLIC WHEEL.

1,256,579.  Specification of Letters Patent.  Patented Feb. 19, 1918.

Application filed March 10, 1917. Serial No. 153,808.

*To all whom it may concern:*

Be it known that I, MAURICE LACHMAN, a citizen of the United States, and a resident of New York, in the county of New York and State of New York, have invented certain new and useful Improvements in Metallic Wheels, of which the following is a specification.

My invention relates to metal wheels constructed from two side plates or disks each having a hub, rim or felly and spoke portion, and spacing plates interposed between and uniting said side plates by edges of the spacing plates turned over edges of segmental or other forms of radially disposed openings in the side plates.

A wheel of this type is shown and described in patent of Edward Fulda, No. 1,177,179, dated March 28th, 1916.

The object of my present invention is to produce a wheel of the general type referred to that shall have the required strength in the hub portion thereof and to accomplish this result by a cheap and simple expedient.

To this end my invention consists essentially in extending the spacing plate referred to into the space between the hub portions of the side plates to form a bridge between said hub portions.

In the accompanying drawings, I show my invention applied to a wheel of the general form described in the Fulda patent before referred to.

Figure 1 is a side elevation of the wheel with part of the hub portion of one of the side plates broken away to show the strengthening extension of the spacing plate.

Fig. 2 is a vertical cross-section through the wheel on the line 2—2 Fig. 1.

Fig. 3 is a vertical cross-section through one of the side plates.

Fig. 4 shows in side view one of the spacing plates formed according to my present invention.

Fig. 5 is a cross-section through one of the spacing plates showing the form thereof prior to the bending of its edges around the edges of the openings in the side plates.

The two side plates 1 of the wheel each comprises. as shown, a hub portion, a rim or felly portion and radial or spoke portions all integral with one another. The hub and rim or felly portions are continuous circumferentially and the portion between is provided with openings, segmental or of other desired form extending in a general radial direction so as to provide between said openings spoke parts.

3 indicates the plates referred to as spacing plates in the previous patent above mentioned, the edges of said plates being turned over the edges of the openings in the side plates. 4 indicates the spacing ribs or projections on said spacing plates. As described in the Fulda patent, a similar plate 6 may be applied from the outside edge or circumference of the side plates to make a wheel with a tubular rim if desired, but this variation in the construction forms no part of my present invention. In the previous constructions the spacing plates 3 are confined to the contour of the openings in the side plates, that is to say, they do not extend into the space between the continuous hub portions of said plates and in order to secure the desired strength in the hub part it was necessary to interpose separate rings or strengthening plates between the hub parts. My present invention aims to dispense with the use of such separate strengthening rings and any accompanying necessary devices for holding the same in position.

To this end I provide the spacing plates 3 with integral extensions 3' extending into the space between the hub portions of the side plates and of such width as to brace or act as a bridge between said hub portions in the finished wheel. Said extension may consist of the two free ends of the continuous plate 3 bent to the desired form or may consist of any other part of the plate, the joint between the ends of said plate after bending to form being located at any other desired part of its periphery. It is desirable that the spacing plate in its extended part 3' should be double to give increased strength, although one end only of the plate might be extended for this purpose, the other end stopping in the part where its edge is turned over to unite the side plates. Edges 5 shown in Fig. 5 would be omitted in the portion 3' although the projections 4 could be retained for additional strength or not, as desired.

What I claim as my invention is:—

1. A wheel constructed essentially of two side plates each having a hub portion and interposed spacing plates locked thereto by edges of the spacing plates turned over edges of openings in the side plates, said spacing plates being extended inwardly into the space between the hub portions of the side plates to form a bridge between them.

2. A metal wheel constructed of two side plates each comprising a hub portion, a rim portion and a spoke portion and interposed spacing plates locked to the side plates by turned over metal edges of the spacing plates, the free ends of said spacing plates being continued radially inward between the hub portions of the side plates to act as strengthening bridges.

3. In a metal wheel, the combination with two side plates each comprising a hub portion, a spoke portion and a rim portion, of interposed spacing plates located in openings in the side plates and locked thereto by folded metal edges of the spacing plates, each said spacing plate having an end continued radially into the space between the continuous or hub portions of the side plates and acting to form a bridge between said hub portions.

4. In a metal wheel, the combination with two side plates each comprising a hub portion, a spoke portion and a rim portion, of sector-shaped spacing plates located in the openings in the side plates and secured thereto, said spacing plates each having a radial integral extension located in the space between the hub portions of said side plates to act as a strengthening means therefor.

Signed at New York, in the county of New York and State of New York, this 8th day of March, A. D. 1917.

MAURICE LACHMAN.

Witnesses:
F. B. TOWNSEND,
IRENE LEFKOWITZ.